United States Patent [19]
Oh

[11] Patent Number: 5,978,057
[45] Date of Patent: Nov. 2, 1999

[54] COMMON LINE CONTACT OF LIQUID CRYSTAL DISPLAY AND METHOD OF FABRICATING THE SAME

[75] Inventor: Young-Jin Oh, Kyongki-do, Rep. of Korea

[73] Assignee: LG Electronics, Inc., Seoul, Rep. of Korea

[21] Appl. No.: 08/888,703

[22] Filed: Jul. 7, 1997

[30]  Foreign Application Priority Data

Aug. 31, 1996 [KR]  Rep. of Korea ............ 96-37419

[51] Int. Cl.[6] .................. G02F 1/1343; G02F 1/136
[52] U.S. Cl. ........................................... 349/139; 349/43
[58] Field of Search ........................ 349/42, 43, 139, 349/122, 141

[56]  References Cited

U.S. PATENT DOCUMENTS

| | | | |
|---|---|---|---|
| 5,521,728 | 5/1996 | Kodate et al. | 359/59 |
| 5,576,857 | 11/1996 | Takemura | 359/59 |
| 5,714,769 | 2/1998 | Kim | 257/59 |

*Primary Examiner*—William L. Sikes
*Assistant Examiner*—Joanne Kim

[57]  ABSTRACT

A common line contact of a liquid crystal display is disclosed including a transparent insulating substrate; first common lines formed on a predetermined portion of the substrate, and connected to the storage electrode of a storage capacitor of a thin film transistor, the thin film transistor being in close proximity to the first common lines; a gate bus line formed between the first common lines on the substrate, the gate bus line connecting the gate electrode of the thin film transistor to an input pad; an insulating layer formed on the substrate and gate bus line, other than a predetermined portion of the first common lines; a second common line formed to come into contact with an exposed portion of the first common lines, and connected to a data line on the insulating layer; a passivation layer formed on the second common line; and a protective layer formed on a portion of the passivation layer, which corresponds to a portion where the first and second common lines come into contact with each other. Therefore, the present invention prevents the contact portion of the first and second common lines from being disconnected during the patterning of the pixel electrode, thereby improving the reliability of LCD.

16 Claims, 4 Drawing Sheets

COMMON LINE CONTACT OF LIQUID CRYSTAL DISPLAY AND METHOD OF FABRICATING THE SAME

BACKGROUND OF THE INVENTION

1. Field of the Invention

The present invention relates to a common line contact of a liquid crystal display (LCD) and a method of fabricating the same and, more specifically, to a common line contact of an LCD and a method of fabricating the same, in which the contact portion between a first common line formed during the fabrication of the gate of a thin film transistor (TFT), and second common line formed during the fabrication of the source and drain of the TFT is prevented from being disconnected, thereby improving the reliability of the device.

2. Discussion of Related Art

A liquid crystal display includes switching elements, such as thin film transistors (TFTs), and pixels having pixel electrodes transmitting or reflecting light, which are connected to the switching elements, and arranged in matrix. The LCD also includes a plurality of gate bus lines and data bus lines, which connect the pixels in a matrix to one another, and a plurality of pads formed at the end of the gate bus lines and data bus lines.

The LCD may also have storage capacitors in order to improve the characteristic of each pixel. The storage electrode of the storage capacitor should be maintained in common ground state by a ground signal externally applied. Accordingly, common lines are required to commonly transmit the ground signal externally applied to the storage electrode of the storage capacitor.

The common lines, which are formed during the fabrication of the TFT, include first common lines formed together with the gate bus lines and in parallel to them during the fabrication of the TFT's gate, and a second common line formed together with the data bus lines and in parallel to them during the fabrication of the TFT's source and drain. The first common lines are connected to the storage electrodes of the storage capacitors. The first common lines and second common line come into contact with each other at a contact portion, to transmit the ground signal of the second common line to the storage electrode through a plurality of first common electrodes.

FIG. 1 is a plan view of a common line contact portion of a conventional LCD. Referring to FIG. 1, first common lines 13 are formed around a TFT (not shown), together with the gate electrode (not shown) of the TFT. An anodized oxide layer 15 is formed on a predetermined portion of first common line 13. A gate bus line 14, which connects the gate electrode to an input pad (not shown), is formed between first common lines 13 during the fabrication of the gate electrode. Anodized oxide layer 15 is also formed on gate bus line 14. An exposed portion of first common lines 13 is connected to a data line (not shown), and electrically connected to a second common line 19 which is formed together with the TFT's source and drain (not shown).

FIG. 2 is a cross-sectional view taken along line I—I of FIG. 1. Referring to FIG. 2, the common line contact portion of the conventional LCD is constructed in such a manner that first common line 13 and gate bus line 14 are formed of an anodizable conductive metal on a transparent insulating substrate 11, the gate bus line being formed between first common lines 13. Anodized oxide layer 15 is formed on gate bus line 14 and on a predetermined portion of first common lines 13. An insulating layer 17 having a contact hole is formed of a silicon oxide ($SiO_2$) or silicon nitride ($Si_3N_4$) on first common lines 13. Second common line 19 is formed of a conductive metal on insulating layer 17 together with the source and drain, and electrically connected to first common lines 13. A passivation layer 21 is formed of an insulating material on second common line 19.

FIGS. 3A, 3B and 3C are cross-sectional views showing a conventional method of fabricating the common line contact of an LCD. Referring to FIG. 3A, an anodizable metal is deposited on transparent insulating substrate 11 through sputtering, and patterned by photolithography, forming first common lines 13. Here, gate bus line 14, which connects the gate electrode (not shown) to the input pad (not shown), is simultaneously formed between first common lines 13. The surface of gate bus line 14 and a predetermined portion of first common lines 13 is anodized, forming anodizing oxide layer 15.

Referring to FIG. 3B, a silicon oxide ($SiO_2$) or silicon nitride ($Si_3N_4$) is deposited on transparent substrate 11 and anodizing layer 15 including an exposed portion of first common lines 13 through chemical vapor deposition (CVD), forming insulating layer 17. A predetermined portion of insulating layer 17 is removed through photolithography, to expose first common lines 13.

Referring to FIG. 3C, a metal such as Cr is deposited on first common lines 13 and insulating layer 17 through CVD, to form second common line 19. An insulating material like silicon oxide ($SiO_2$) or silicon nitride ($Si_3N_4$) is deposited on second common line 19 through CVD, forming passivation layer 21.

The above-described conventional process of fabricating the common line contact of an LCD is simultaneously performed with the fabrication process of the TFT. Accordingly, indium tin oxide (ITO) (for forming the pixel electrode of the TFT) is also deposited on the passivation layer 21, so that the ITO deposited on the passivation layer is removed when the pixel electrode is patterned. Since the materials forming the first and second common lines have thermal expansion factors different from each other, cracking due to stress is generated at the portion where the first and second common lines come into contact with each other. When the ITO is removed, an etchant for etching the ITO permeates into the crack, etching the first and second common lines. Thus, the contact portion of the first and second common lines is disconnected, deteriorating the reliability of the device.

SUMMARY OF THE INVENTION

Accordingly, the present invention is directed to a common line contact of an LCD and a method of fabricating the same that substantially obviates one or more of the problems due to limitations and disadvantages of the related art.

An object of the present invention is to provide a common line contact of an LCD, in which a protective layer is formed on a passivation layer, to prevent an etchant from permeating into a contact portion of first and second common lines, thereby improving the reliability of LCD.

Another object of the present invention is to provide a method of fabricating a common line contact of an LCD, which prevents the contact portion of the first and second common lines from being disconnected due to etching of the first and second common lines by an etchant used for patterning a pixel electrode of a TFT.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a common line contact of a liquid crystal display, includes a transparent insulating substrate; first common lines formed on a predetermined portion of the substrate, and connected to the storage electrode of a storage capacitor of a thin film transistor, the thin film transistor being in close proximity to the first common lines; a gate bus line formed between the first common lines on the substrate, the gate bus line connecting the gate electrode of the thin film transistor to an input pad; an insulating layer formed on the substrate and gate bus line, other than a predetermined portion of the first common lines; a second common line formed to come into contact with an exposed portion of the first common lines, and connected to a data line on the insulating layer; a passivation layer formed on the second common line; and a protective layer formed on a portion of the passivation layer, which corresponds to a portion where the first and second common lines come into contact with each other.

To accomplish the objects of the present invention, there is provided a method of fabricating a common line contact of a liquid crystal display, the method including the steps of: forming first common lines and a gate bus line on a predetermined portion of a transparent insulating substrate, the gate bus line being formed between the first common lines; forming an insulating layer on the substrate and gate bus line, other than a predetermined portion of the first common lines; forming a second common line on the insulating layer, to come into contact with the first common lines; forming a passivation layer on the second common line; and forming a protective layer on a portion of the passivation layer, which corresponds to a portion where the first and second common lines come into contact with each other.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

DETAILED DESCRIPTION OF PREFERRED EMBODIMENT

Reference will now be made in detail to the preferred embodiments of the present invention, examples of which are illustrated in the accompanying drawings.

Figure 1:
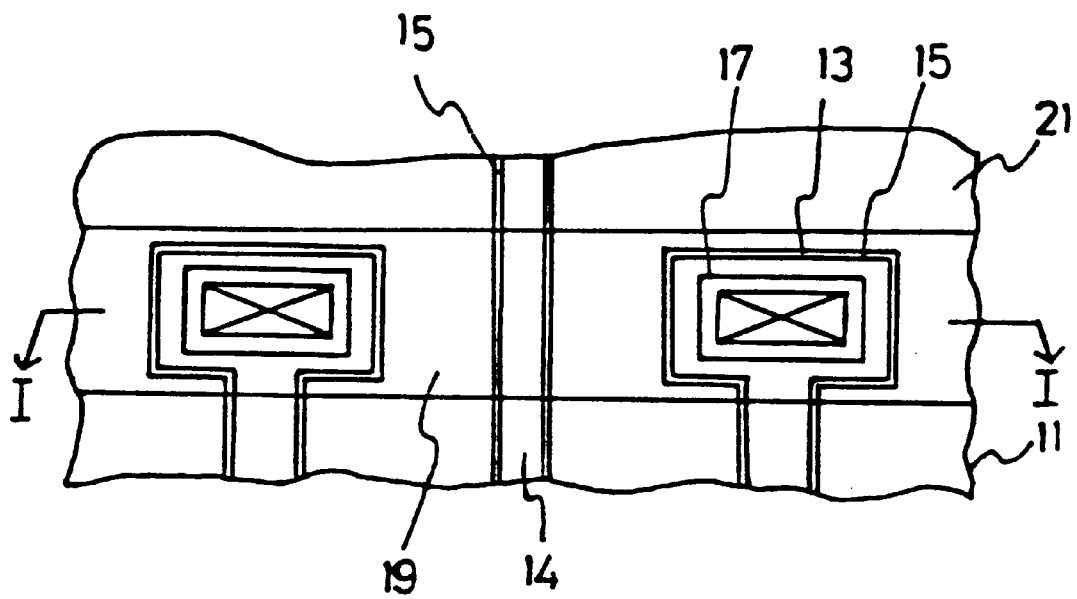
FIG. 1 is a plan view of a common line contact of a conventional LCD.
Figure 2:
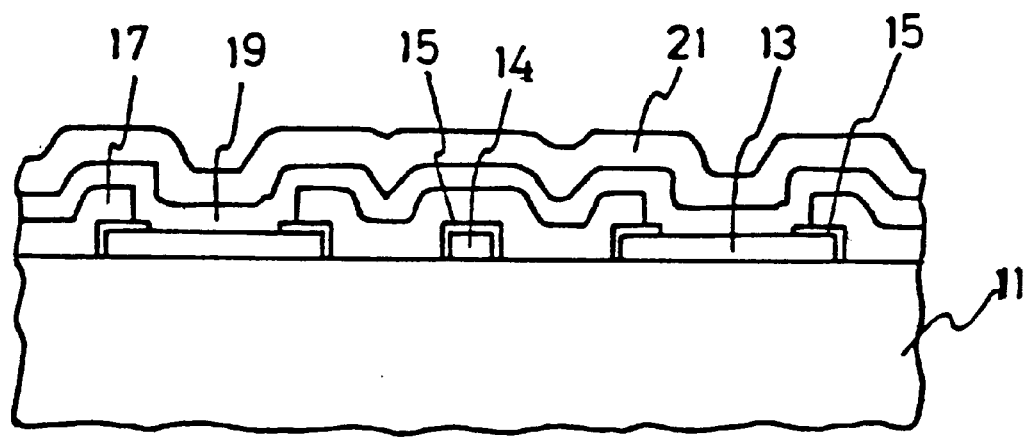
FIG. 2 is a cross-sectional view taken along line I—I of FIG. 1.
Figure 3A:
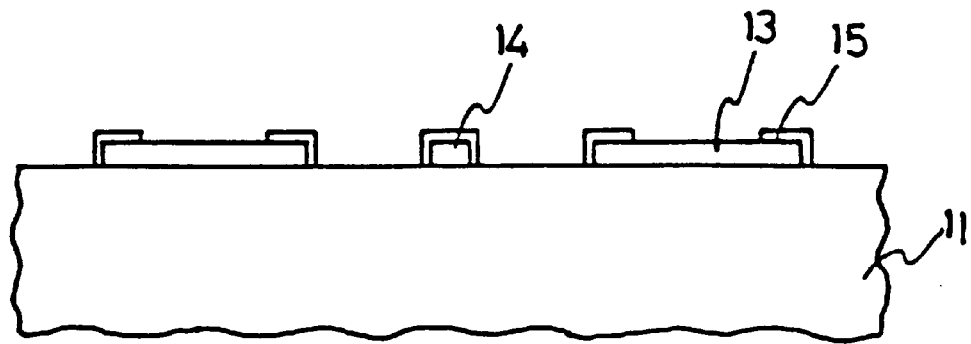
FIGS. 3A, 3B and 3C are cross-sectional views showing a conventional method of fabricating a common line contact of an LCD.
Figure 3B:
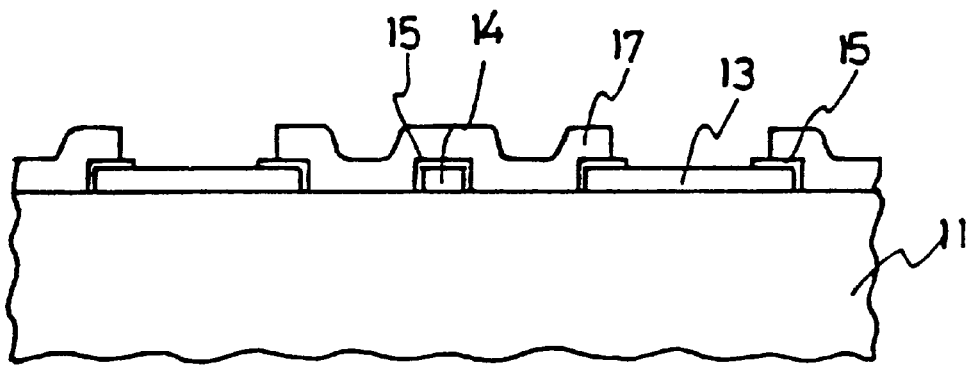
Figure 3C:
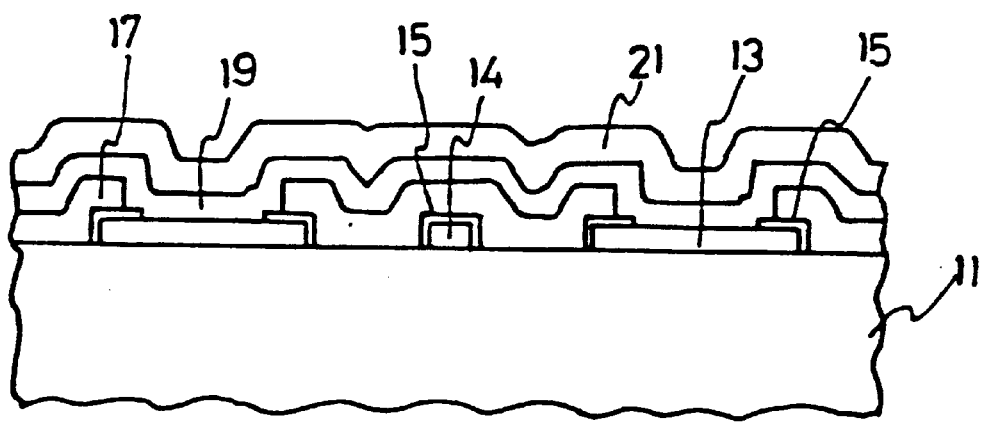
Figure 4:
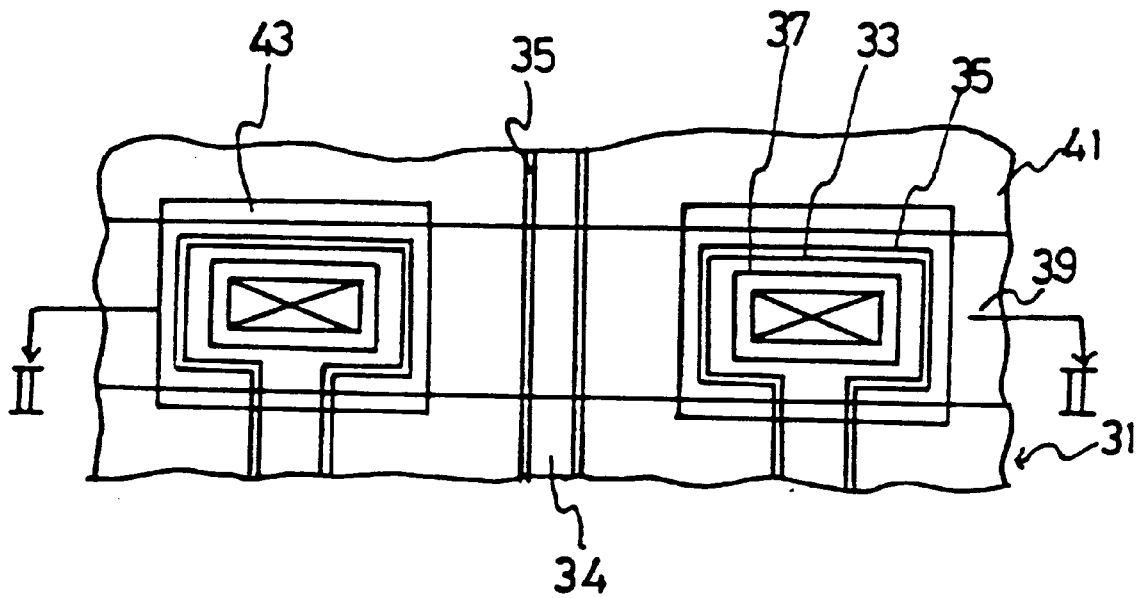
FIG. 4 is a plan view of a common line contact of an LCD according to the present invention.

FIG. 4 is a plan view of a common line contact of an LCD according to the present invention. Referring to FIG. 4, the common line contact portion of an LCD according to the present invention is constructed in such a manner that first common lines 33 are formed around a TFT (not shown), together with a gate electrode (not shown), and a gate bus line 34, which connects the gate electrode to an input pad (not shown), is simultaneously formed between first common lines 33. An anodized oxide layer 35 is formed on gate bus line 34 and a predetermined portion of first common lines 33. An exposed portion of first common lines 33 is connected to a data line (not shown), and electrically connected to a second common line 39 which is formed together with the TFT's source and drain (not shown). A protective layer 43 is formed on a portion where first and second common lines 33 and 39 come into contact with each other.

Figure 5:
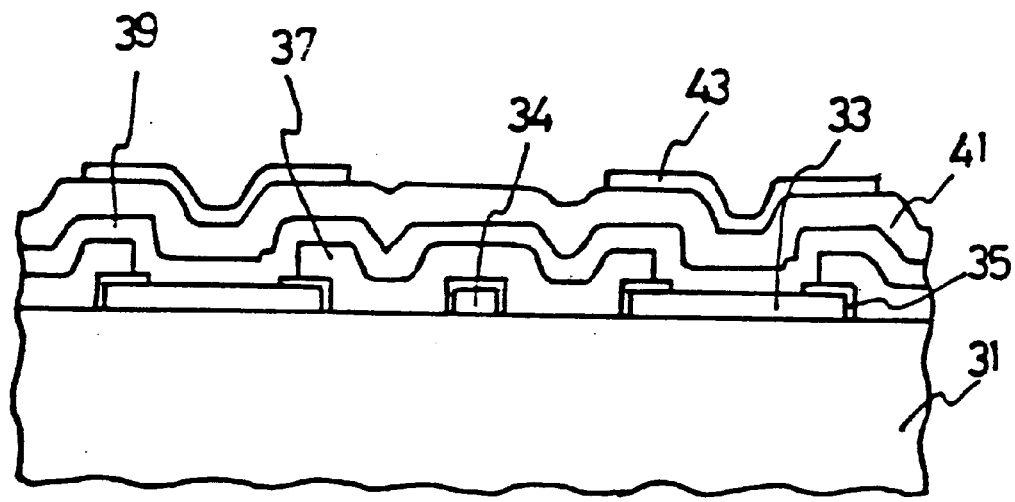
FIG. 5 is a cross-sectional view taken along line II—II of FIG. 4.

FIG. 5 is a cross-sectional view taken along line II—II of FIG. 4. Referring to FIG. 5, the common line contact portion of an LCD of the present invention is constructed in such a manner that first common lines 33 are formed on a transparent insulating substrate 31, and gate bus line 34 is formed between first common lines 33. First common lines 33 and gate bus line 34 may be formed of an anodizable metal, such as aluminum (Al), aluminum alloy, molybdenum (Mo), molybdenum alloy, titanium (Ti), titanium alloy, tantalum (Ta), tantalum alloy, cobalt (Co) and cobalt alloy, by a thickness of 2,000 to 3,000 Å. Anodized oxide layer 35 is formed on gate bus line 34 and on a predetermined portion of first common lines 33. Anodized oxide layer 35 is formed in a manner that a photoresist layer (not shown) is formed on a predetermined portion of first common lines 33, and an exposed portion of the first common lines is anodized.

An insulating layer 37 is formed of a silicon oxide ($SiO_2$) or silicon nitride ($Si_3N_4$) by a thickness of 3,000 to 4,000 Å on insulating substrate 31 and anodized oxide layer 35. Insulating layer 37 has a contact hole on first common lines 33, so that the insulating layer is not formed on first common lines 33. A conductive metal such as Cr is deposited on insulating layer 37 by a thickness of 2,000 to 3,000 Å, to form second common line 39 which is electrically connected to first common lines 33. Second common line 39 is connected to a data line (not shown), and formed together with the TFT's source and drain.

A silicon oxide ($SiO_2$) or silicon nitride ($Si_3N_4$) is deposited on second common line 39 at a thickness of 3,000 to 4,000 Å, to form a passivation layer 41. A protective layer 43 is formed on a portion of passivation layer 41, which corresponds to a portion where first and second common lines 33 and 39 come into contact with each other. Protective layer 43 is formed of a transparent material like ITO or $SnO_2$ at a thickness of 300 to 800 Å, and formed together with the pixel electrode (not shown) of the TFT. Accordingly, protective layer 43 prevents an etchant used for patterning the pixel electrode from permeating into the contact portion of the first and second common lines via cracks generated due to different thermal expansion factor of the first and second common lines.

Figure 6A:
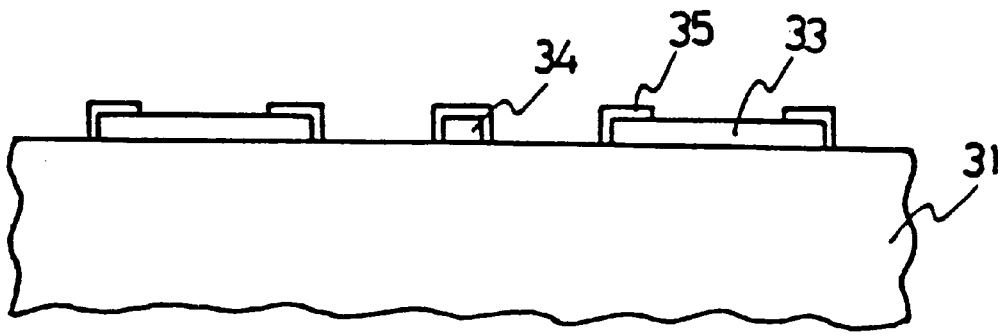
FIGS. 6A, 6B and 6C are cross-sectional views showing a method of fabricating a common line contact of an LCD according to the present invention.
Figure 6B:
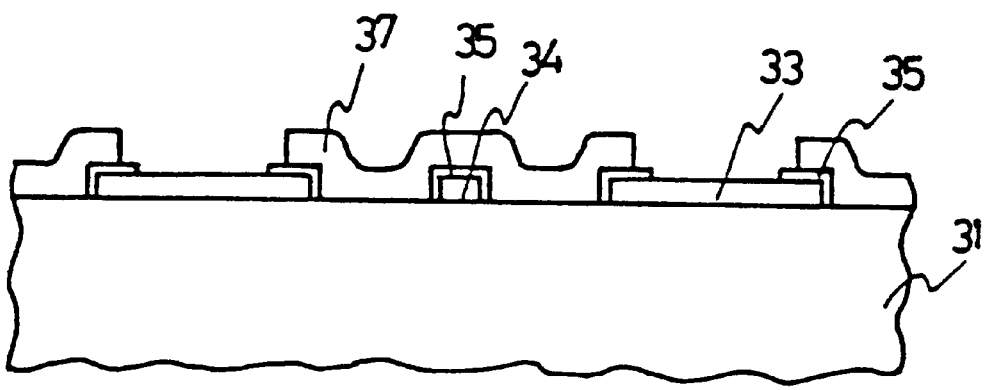
Figure 6C:
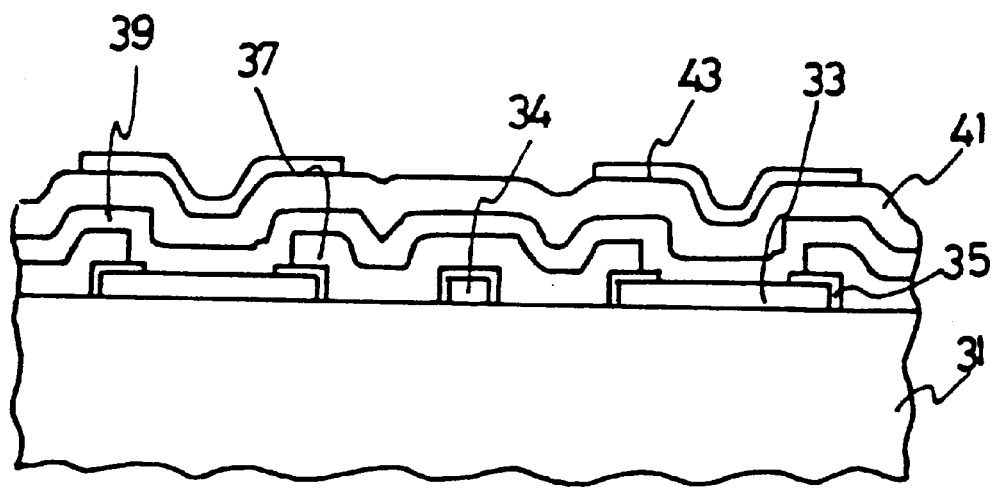

FIGS. 6A, 6B and 6C are cross-sectional views showing a method of fabricating a common line contact of an LCD according to the present invention. Referring to FIG. 6A, an anodizable metal, such as aluminum (Al), aluminum alloy, molybdenum (Mo), molybdenum alloy, titanium (Ti), titanium alloy, tantalum (Ta), tantalum alloy, cobalt (Co) and cobalt alloy, is deposited on transparent insulating substrate 31 such as glass or soda lime substrate, by a thickness of 2,000 to 3,000 Å through sputtering, and then patterned by photolithography, thereby forming first common lines 33. Here, gate bus line 34, which connects the gate electrode (not shown) to the input pad (not shown), is simultaneously formed between first common lines 33. The surface of gate bus line 34 and a predetermined portion of first common lines 33 is anodized, forming anodized oxide layer 35. Anodized oxide layer 35 is formed in such a manner that a photoresist layer (not shown) is formed on a predetermined portion of first common lines 33, an exposed portion of the first common lines is anodized, and then the photoresist layer is removed.

Referring to FIG. 6B, a silicon oxide ($SiO_2$) or silicon nitride ($Si_3N_4$) is deposited on transparent substrate 31 and anodizing layer 35 including the exposed portion of first common lines 33 by a thickness of 3,000 to 4,000 Å through CVD, forming insulating layer 37. A predetermined portion of insulating layer 37 is removed through photolithography, to expose first common lines 33.

Referring to FIG. 6C, a conductive metal such as Cr is deposited on first common lines 33 and insulating layer 37 by a thickness of 2,000 to 3,000 Å through CVD, forming second common line 39. Second common line 39 is connected to the data line (not shown), and electrically connected to the source and drain (not shown) of the TFT. An insulating material like silicon oxide ($SiO_2$) or silicon nitride ($Si_3N_4$) is deposited on second common line 39 by a thickness of 3,000 to 4,000 Å through CVD, forming passivation layer 41. Thereafter, a transparent conductive material such as ITO or $SnO_2$, which is for forming a pixel electrode (not shown) for the TFT and the protective in part layer 43, is deposited on passivation layer 39 at a thickness of 300 to 800 Å. Protective layer 43 is patterned (together with the pixel electrode of the IFT) through a photolithography process including wet etching, to be left on a portion of passivation layer 41, which corresponds to the contact portion of first and second common lines 33 and 39.

As described above, the present invention forms the protective layer on a portion of the passivation layer, which corresponds to the contact portion of the first and second common lines. Accordingly, the etchant used for patterning the pixel electrode is prevented from permeating into the cracks generated due to stress caused by different thermal expansion factors of the first and second common lines. Therefore, the present invention prevents the contact portion of the first and second common lines from being disconnected during the patterning of the pixel electrode, thereby improving the reliability of LCD.

It will be apparent to those skilled in the art that various modifications and variations can be made in the common line contact of an LCD and method of fabricating the same of the present invention without departing from the spirit or scope of the invention. Thus, it is intended that the present invention cover the modifications and variations of this invention provided they come within the scope of the appended claims and their equivalents.

What is claimed is:

1. A common line contact of a liquid crystal display, comprising:

a transparent insulating substrate;

first common lines formed on the substrate;

a gate bus line formed between the first common lines on the substrate;

an insulating layer formed on the substrate, gate bus line, and portions of the first common lines;

a second common line formed to come into contact with an exposed portion of the first common lines;

a passivation layer formed on the second common line; and a protective layer formed on selected portions of the passivation layer, said selected portions of the passivation layer being located over intersections where the first and second common lines come into contact with each other.

2. A common line contact of a liquid crystal display as claimed in claim 1, wherein the first common lines are formed of an anodized metal that includes aluminum (Al), aluminum alloy, molybdenum (Mo), molybdenum alloy, titanium (Ti), titanium alloy, tantalum (Ta), tantalum alloy, cobalt (Co) or cobalt alloy.

3. A common line contact of a liquid crystal display as claimed in claim 1, wherein the gate bus line is formed of an anodizable metal that includes aluminum (Al), aluminum alloy, molybdenum (Mo), molybdenum alloy, titanium (Ti), titanium alloy, tantalum (Ta), tantalum alloy, cobalt (Co) or cobalt alloy.

4. A common line contact of a liquid crystal display as claimed in claim 1, further comprising an anodized oxide layer formed on at least a portion of the first common lines.

5. A common line contact of a liquid crystal display as claimed in claim 1, further comprising an anodized oxide layer formed on the gate bus line.

6. The common line contact of a liquid crystal display as claimed in claim 1, wherein the second common line is formed of Cr.

7. The common line contact of a liquid crystal display as claimed in claim 1, wherein the protective layer is formed of ITO or $SnO_2$.

8. The common line contact of a liquid crystal display as claimed in claim 7, wherein the protective layer has a thickness in a range of 300 to 800 Å.

9. A common line contact of a liquid crystal display as claimed in claim 1, wherein the protective layer is formed of a transparent conductive material.

10. A method of fabricating a common line contact of a liquid crystal display, the method comprising the steps of:

forming first common lines and a gate bus line on a transparent insulating substrate, the gate bus line being formed between the first common lines;

forming an insulating layer on the substrate, gate bus line, and portions of the first common lines;

forming a second common line on the insulating layer, to come into contact with the first common lines;

forming a passivation layer on the second common line; and forming a protective layer on selected portions of the passivation layer, said selected portions of the passivation layer being located over intersections where the first and second common lines come into contact with each other.

11. The method as claimed in claim 10, wherein the first common lines and gate bus line are formed of an anodizable metal that includes aluminum (Al), aluminum alloy, molybdenum (Mo), molybdenum alloy, titanium (Ti), titanium alloy, tantalum (Ta), tantalum alloy, cobalt (Co) or cobalt alloy.

12. The method as claimed in claim 10, further comprising the step of forming an anodized oxide layer on the gate bus line and at least a portion of the first common lines.

13. The method as claimed in claim 10, wherein the second common line is formed of Cr.

14. The method as claimed in claim 10, wherein the protective layer is formed of ITO or $SnO_2$.

15. The method as claimed in claim 14, wherein the protective layer has a thickness in a range of 300 to 800 Å.

16. The method as claimed in claim 10, wherein the protective layer is formed concurrently with pixel electrodes.

* * * * *